(12) United States Patent
Yang et al.

(10) Patent No.: US 9,753,328 B2
(45) Date of Patent: Sep. 5, 2017

(54) TFT-LCD PANEL, METHOD FOR PREPARING THE SAME AND TFT DISPLAY DEVICE

(71) Applicant: BOE TECHNOLOGY GROUP CO., LTD., Beijing (CN)

(72) Inventors: Yafeng Yang, Beijing (CN); Teruaki Suzuki, Beijing (CN); Jaegeon You, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 405 days.

(21) Appl. No.: 14/409,758

(22) PCT Filed: May 16, 2014

(86) PCT No.: PCT/CN2014/077641
§ 371 (c)(1),
(2) Date: Dec. 19, 2014

(87) PCT Pub. No.: WO2015/067022
PCT Pub. Date: May 14, 2015

(65) Prior Publication Data
US 2016/0274399 A1    Sep. 22, 2016

(30) Foreign Application Priority Data
Nov. 11, 2013    (CN) .......................... 2013 1 0556548

(51) Int. Cl.
*G02F 1/13363* (2006.01)
*G02F 1/1368* (2006.01)
(Continued)

(52) U.S. Cl.
CPC ........ *G02F 1/13363* (2013.01); *G02F 1/1339* (2013.01); *G02F 1/1341* (2013.01);
(Continued)

(58) Field of Classification Search
None
See application file for complete search history.

(56) References Cited

U.S. PATENT DOCUMENTS

| 2004/0125326 A1* | 7/2004 | Nam ..................... G02F 1/1345 |
|---|---|---|
| | | 349/187 |
| 2007/0019139 A1* | 1/2007 | Matsubara .......... G02F 1/13363 |
| | | 349/117 |

(Continued)

FOREIGN PATENT DOCUMENTS

| CN | 1487339 A | 4/2004 |
|---|---|---|
| CN | 1922537 A | 2/2007 |

(Continued)

OTHER PUBLICATIONS

Written Opinion of the International Searching Authority for international application No. PCT/CN2014/077641.

*Primary Examiner* — Dennis Y Kim
(74) *Attorney, Agent, or Firm* — Harness, Dickey & Pierce, P.L.C.

(57) ABSTRACT

Provided are TFT-LCD panel, method for preparing the same, and TFT display device. The TFT-LCD panel includes an upper polarizer, a positive birefringence polymer substrate, a liquid crystal layer, a negative birefringence polymer substrate and a lower polarizer, wherein the positive birefringence polymer substrate and the negative birefringence polymer substrate locate at an upper side and an lower side of the liquid crystal layer respectively, the upper polarizer locates at an upper surface of the positive birefringence polymer substrate, the lower polarizer locates at a lower surface of the negative birefringence polymer substrate; the positive birefringence polymer substrate and the negative birefringence polymer substrate are equals in a birefringence retardation in an original birefringence state, and are equals in a birefringence retardation of in the photo-elasticity (Continued)

birefringence state. The TFT-LCD panel of the present disclosure may avoid generating light leakage in dark, and improve homogeneity in dark.

9 Claims, 1 Drawing Sheet

(51) Int. Cl.
    *G02F 1/1341* (2006.01)
    *G02F 1/1335* (2006.01)
    *G02F 1/1339* (2006.01)
    *G02F 1/1333* (2006.01)
    *G02F 1/1337* (2006.01)

(52) U.S. Cl.
    CPC ...... *G02F 1/1368* (2013.01); *G02F 1/133305* (2013.01); *G02F 1/133512* (2013.01); *G02F 1/133528* (2013.01); *G02F 1/133723* (2013.01); *G02F 2001/133531* (2013.01); *G02F 2202/02* (2013.01); *G02F 2202/022* (2013.01); *G02F 2202/40* (2013.01); *G02F 2413/13* (2013.01); *G02F 2413/14* (2013.01)

(56) References Cited

U.S. PATENT DOCUMENTS

| | | | |
|---|---|---|---|
| 2007/0200987 A1* | 8/2007 | Yoda | G02B 5/3016 349/119 |
| 2011/0051034 A1 | 3/2011 | Egi et al. | |
| 2011/0211135 A1* | 9/2011 | Sharp | G02B 27/2264 349/15 |
| 2011/0268939 A1 | 11/2011 | Liu et al. | |
| 2012/0212692 A1* | 8/2012 | Ryu | G02B 1/04 349/96 |

FOREIGN PATENT DOCUMENTS

| | | | | |
|---|---|---|---|---|
| CN | 101713883 A | 5/2010 | | |
| CN | 101884005 A | 11/2010 | | |
| CN | 102549485 A | 7/2012 | | |
| CN | 103558710 A | 2/2014 | | |
| JP | EP 0883016 A1 * | 12/1998 | ........... | G02B 5/3083 |
| JP | 2011221462 A | 11/2011 | | |

* cited by examiner

TFT-LCD PANEL, METHOD FOR PREPARING THE SAME AND TFT DISPLAY DEVICE

CROSS-REFERENCE TO RELATED APPLICATIONS

This application is the U.S. national phase of PCT Application No. PCT/CN2014/077641 filed on May 16, 2014, which claims priority to Chinese Patent Application No. 201310556548.X filed on Nov. 11, 2013, the disclosures of both of which are incorporated in their entirety by reference herein.

TECHNICAL FIELD

The present invention relates to a TFT-LCD panel, a method for preparing the same and a TFT display device.

BACKGROUND

A thin film transistor-liquid crystal display (TFT-LCD), having advantages of a small size, low power consumption and radiation free, has been rapidly developed in recent years. The TFT-LCD includes: a liquid crystal display panel, a drive circuit and a backlight, in which the liquid crystal display panel is the most important portion in the TFT-LCD, which is formed by injecting a liquid crystal between two glass substrates, sealing surroundings between the two glass substrates by a sealant, and attaching two polarizers, of which their polarization directions are perpendicular to each other, onto the two glass substrates respectively. Among them, the upper glass substrate is a color filter, with three primary color filters (red, green and blue) constituting a pixel, and a transparent common electrode being plated on the color filter; and the lower glass substrate is a TFT array substrate, with a large number of thin film transistors arranging in matrix and some peripheral circuits being plated thereon.

As the glass itself is an isotropic medium, without influenced by any external forces, the glass itself does not generate a birefringence, however, in accordance with stress-optical law, in case the glass generates a stress change, due to a role of the stress, refractions of the glass towards different directions generate different changes respectively, so that the birefringence generates, resulting in light leakage (shown as FIG. 1). In the field of liquid crystal display, the light leakage resulted from the refraction changes along with glass deformation, is very unfavorable for display quality of the liquid crystal display screen.

SUMMARY

For the above reason, embodiments of the present disclosure provide a TFT-LCD panel and a method for preparing the same, as well as a TFT display device. By replacing a glass substrate with a positive birefringence polymer substrate and a negative birefringence polymer substrate, the TFT-LCD panel avoids generating light leakage in dark, and improves homogeneity in dark.

To solve the above technical problem, an embodiment of the present disclosure provides a thin film transistor-liquid crystal display (TFT-LCD) panel, which comprises an upper polarizer, a positive birefringence polymer substrate, a liquid crystal layer, a negative birefringence polymer substrate and a lower polarizer, wherein the positive birefringence polymer substrate locates at an upper side of the liquid crystal layer, the negative birefringence polymer substrate locates at an lower side of the liquid crystal layer, the upper polarizer locates at an upper surface of the positive birefringence polymer substrate, the lower polarizer locates at a lower surface of the negative birefringence polymer substrate; a birefringence retardation of the positive birefringence polymer substrate in an original birefringence (OB) state equals to a birefringence retardation of the negative birefringence polymer substrate in the original birefringence state, a birefringence retardation of the positive birefringence polymer substrate in a photo-elasticity birefringence (PB) state equals to a birefringence retardation of the negative birefringence polymer substrate in the photo-elasticity birefringence state.

In an example of the present disclosure, the birefringence retardation of the positive birefringence polymer substrate in the original birefringence state and the birefringence retardation of the negative birefringence polymer substrate in the original birefringence state both equal to zero, the birefringence retardation of the positive birefringence polymer substrate in the photo-elasticity birefringence state and the birefringence retardation of the negative birefringence polymer substrate in the photo-elasticity birefringence state both equal to zero.

In an example of the present disclosure, the positive birefringence polymer substrate comprises a positive birefringence substrate, a colored layer, a light-shielding layer and a polyimide (PI) alignment film.

In which, the positive birefringence substrate is formed by polymerizing a monomer of a positive refractive index polymer.

The monomer of the positive refractive index polymer for example is 4-cinnamoylphenyl methacrylate (CPMA).

In another example of the present disclosure, the negative birefringence polymer substrate comprises a negative birefringence substrate, a TFT array and a polyimide (PI) alignment film.

In which, the negative birefringence substrate is formed by polymerizing a monomer of a negative refractive index polymer.

The monomer of the negative refractive index polymer for example is methyl methacrylate (MMA).

In an example of the present disclosure, a polarization direction of the upper polarizer is perpendicular to a polarization direction of the lower polarizer.

Another embodiment of the present disclosure also provides a method for manufacturing a TFT-LCD panel, which includes following steps:

S1: manufacturing a positive birefringence polymer substrate, polymerizing a monomer of a positive refractive index polymer to form a positive birefringence substrate; manufacturing a light-shielding layer and a colored layer on the positive birefringence substrate, and then manufacturing a polyimide alignment film by printing orientation, to form the positive birefringence polymer substrate;

S2: manufacturing a negative birefringence polymer substrate, polymerizing a monomer of a negative refractive index polymer to form a negative birefringence substrate, a birefringence retardation of the negative birefringence substrate in an original birefringence state being equal to a birefringence retardation of the positive birefringence substrate in the original birefringence state, and a birefringence retardation of the negative birefringence substrate in a photo-elasticity birefringence state being equal to a birefringence retardation of the positive birefringence substrate in the photo-elasticity birefringence state; manufacturing a TFT array on the negative birefringence substrate, and manufacturing a PI alignment film by printing orientation, to form the negative birefringence polymer substrate;

S3: injecting a liquid crystal between the positive birefringence polymer substrate and the negative birefringence polymer substrate, and sealing the positive birefringence polymer substrate and the negative birefringence polymer substrate by a sealant;

S4: attaching an upper polarizer on an upper surface of the positive birefringence polymer substrate in S3, attaching a lower polarizer on a lower surface of the negative birefringence polymer substrate in S3, wherein a polarization direction of the upper polarizer is perpendicular to a polarization direction of the lower polarizer, to form the TFT-LCD panel.

A further embodiment of the present disclosure also provides a TFT display device, which includes the TFT-LCD panel according to embodiments of the present disclosure.

When there is no deformation, as an optic axis direction of the positive birefringence polymer substrate is perpendicular to an optic axis direction of the negative birefringence polymer substrate, with equivalent birefringence retardations, by this time, in case of combining the positive birefringence polymer substrate and the negative birefringence polymer substrate, the birefringence retardation of the positive birefringence polymer substrate and the birefringence retardation of the negative birefringence polymer substrate are mutually offset, thus the TFT-LCD panel according to embodiments of the present disclosure has no retardation and does not generate light leakage. When a deformation occurs, as the positive birefringence polymer substrate and the negative birefringence polymer substrate themselves both have the deformation, and both generate the birefringence, by this time an optic axis caused by a deformation of the positive birefringence polymer substrate is perpendicular to an optic axis caused by a deformation of the negative birefringence polymer substrate, with equivalent birefringence retardations, thus the TFT-LCD panel according to embodiments of the present disclosure has no retardation and does not generate light leakage.

DETAILED DESCRIPTION

Figure 1:
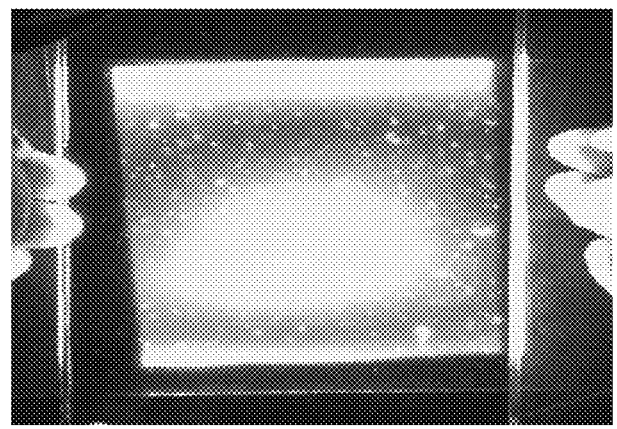
FIG. 1 illustrates a photo showing that a liquid crystal panel generates a phenomenon of light leakage as stress changing in prior art.

According to an embodiment of the present disclosure, there is provided a TFT-LCD panel, which includes a positive birefringence polymer substrate, a liquid crystal layer, a negative birefringence polymer substrate and a lower polarizer, wherein the positive birefringence polymer substrate locates at an upper side of the liquid crystal layer, the negative birefringence polymer substrate locates at an lower side of the liquid crystal layer, the upper polarizer locates at an upper surface of the positive birefringence polymer substrate, the lower polarizer locates at a lower surface of the negative birefringence polymer substrate; a birefringence retardation of the positive birefringence polymer substrate in an original birefringence state equals to a birefringence retardation of the negative birefringence polymer substrate in the original birefringence state, a birefringence retardation of the positive birefringence polymer substrate in a photo-elasticity birefringence state equals to a birefringence retardation of the negative birefringence polymer substrate in the photo-elasticity birefringence state.

In an example of the present disclosure, the birefringence retardation of the positive birefringence polymer substrate in the original birefringence state and the birefringence retardation of the negative birefringence polymer substrate in the original birefringence state both equal to zero, the birefringence retardation of the positive birefringence polymer substrate in the photo-elasticity birefringence state and the birefringence retardation of the negative birefringence polymer substrate in the photo-elasticity birefringence state both equal to zero.

In an example of the present disclosure, the positive birefringence polymer substrate includes a positive birefringence substrate, a colored layer, a light-shielding layer and a polyimide alignment film.

In which, the positive birefringence substrate is formed by polymerizing a monomer of a positive refractive index polymer.

The monomer of the positive refractive index polymer for example is 4-cinnamoylphenyl methacrylate.

In another example of the present disclosure, the negative birefringence polymer substrate include a negative birefringence substrate, a TFT array and a PI alignment film.

In which, the negative birefringence substrate is formed by polymerizing a monomer of a negative refractive index polymer.

The monomer of the negative refractive index polymer for example is methyl methacrylate.

In an example of the present disclosure, a polarization direction of the upper polarizer is perpendicular to a polarization direction of the lower polarizer.

In embodiments of the present disclosure, the expression "a birefringence retardation of the positive birefringence substrate equals to a birefringence retardation of the negative birefringence substrate" used herein refers to the birefringence retardation of the positive birefringence substrate and the birefringence retardation of the negative birefringence substrate are both very small (smaller than 20 nm) and equal to each other, while the optic axis direction of the positive birefringence substrate is perpendicular to the optic axis direction of the negative birefringence substrate. In premise of without consideration on the birefringence of the polymer itself, when being stretched and compressed, a refractive index change of the positive birefringence substrate is opposite with a refractive index change of the negative birefringence substrate, and the optic axis direction of the positive birefringence substrate is parallel to the optic axis direction of the negative birefringence substrate during the change.

According to another embodiment of the present disclosure, there is provided a method for manufacturing a TFT-LCD panel, which includes following steps:

S1: manufacturing a positive birefringence polymer substrate, polymerizing a monomer of a positive refractive index polymer to form a positive birefringence substrate; manufacturing a light-shielding layer and a colored layer on the positive birefringence substrate, and then manufacturing a polyimide alignment film by printing orientation, to form the positive birefringence polymer substrate;

S2: manufacturing a negative birefringence polymer substrate, wherein polymerizing a monomer of a negative refractive index polymer to form a negative birefringence substrate, a birefringence retardation of the negative birefringence substrate in an original birefringence state being equal to a birefringence retardation of the positive birefringence substrate in the original birefringence state, and a birefringence retardation of the negative birefringence substrate in a photo-elasticity birefringence state being equal to a birefringence retardation of the positive birefringence substrate in the photo-elasticity birefringence state; manufacturing a TFT array on the negative birefringence substrate, and manufacturing a PI alignment film being manufactured by printing orientation, to form the negative birefringence polymer substrate;

S3: injecting a liquid crystal between the positive birefringence polymer substrate and the negative birefringence polymer substrate, and sealing the positive birefringence polymer substrate and the negative birefringence polymer substrate by a sealant;

S4: attaching an upper polarizer on an upper surface of the positive birefringence polymer substrate in S3, attaching a lower polarizer on a lower surface of the negative birefringence polymer substrate in S3, wherein a polarization direction of the upper polarizer is perpendicular to a polarization direction of the lower polarizer, to form the TFT-LCD panel.

In embodiments of the present disclosure, manufacturing processes used in the method for manufacturing the TFT-LCD panel are conventional processes used in existing methods for manufacturing the TFT-LCD panel, which are omitted herein for brevity.

In embodiments of the present disclosure, principles for reducing light leakage in dark by the TFT-LCD panel are as below:

A. When there is no deformation in a TFT-LCD panel, as the optic axis direction of the positive birefringence polymer substrate is perpendicular to the optic axis direction of the negative birefringence polymer substrate, with equivalent birefringence retardations (for example, the birefringence retardation of the positive birefringence polymer substrate and the birefringence retardation of the negative birefringence polymer substrate both equal to zero), by this time, in case of combining the positive birefringence polymer substrate and the negative birefringence polymer substrate, the birefringence retardation of the positive birefringence polymer substrate and the birefringence retardation of the negative birefringence polymer substrate are mutually offset, there is no retardation, thus light leakage does not occur.

B. when a deformation occurs in a TFT-LCD panel, as the positive birefringence polymer substrate and the negative birefringence polymer substrate themselves both have the deformation, and both generate the birefringence, by this time an optic axis caused by a deformation of the positive birefringence polymer substrate is perpendicular to an optic axis caused by a deformation of the negative birefringence polymer substrate, with equivalent birefringence retardations, thus there is no retardation and light leakage does not occur.

The TFT-LCD panel of the present disclosure will be further described combining with specific examples below.

EXAMPLE 1

1.1 TFT-LCD Panel

Figure 2:
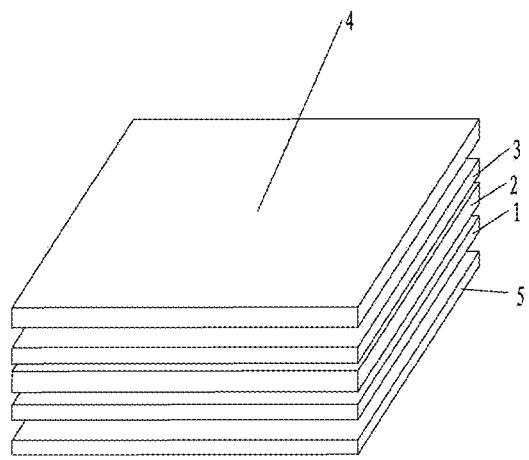
FIG. 2 is a schematic view showing a TFT-LCD panel according to example 1 of the present disclosure.

Shown as FIG. 2, a structure of the TFT-LCD panel includes an upper polarizer 4, a positive birefringence polymer substrate 3, a liquid crystal layer 2, a negative birefringence polymer substrate 1 and a lower polarizer 5, wherein the positive birefringence polymer substrate 3 locates at an upper side of the liquid crystal layer 2, the negative birefringence polymer substrate 1 locates at an lower side of the liquid crystal layer 2, the upper polarizer 4 locates at an upper surface of the positive birefringence polymer substrate 3, the lower polarizer 5 locates at a lower surface of the negative birefringence polymer substrate 1.

In which, a birefringence retardation of the positive birefringence polymer substrate 3 in an original birefringence (OB) state equals to a birefringence retardation of the negative birefringence polymer substrate 1 in the original birefringence (OB) state (for example, both equal to zero); a birefringence retardation of the positive birefringence polymer substrate 3 in a photo-elasticity birefringence (PB) state equals to a birefringence retardation of the negative birefringence polymer substrate 1 in the photo-elasticity birefringence (PB) state (for example, both equal to zero).

When there is no deformation in the TFT-LCD panel of the present example, as the optic axis direction of the positive birefringence polymer substrate 3 is perpendicular to the optic axis direction of the negative birefringence polymer substrate 1, with equivalent birefringence retardations (for example, both equal to zero), by this time, in case of combining the positive birefringence polymer substrate 3 and the negative birefringence polymer substrate 1, the birefringence retardation of the positive birefringence polymer substrate 3 and the birefringence retardation of the negative birefringence polymer substrate 1 are mutually offset, there is no retardation, thus light leakage does not occur.

When a deformation occurs in the TFT-LCD panel of the present example, as the positive birefringence polymer substrate 3 and the negative birefringence polymer substrate 1 themselves both have the deformation, and both generate the birefringence, by this time an optic axis caused by a deformation of the positive birefringence polymer substrate 3 is perpendicular to an optic axis caused by a deformation of the negative birefringence polymer substrate 1, with equivalent birefringence retardations, thus there is no retardation and light leakage does not occur.

1.2 Method for Manufacturing a TFT-LCD Panel

The TFT-LCD panel shown as FIG. 2 for example may be manufactured according to following steps of method:

S1: manufacturing a positive birefringence polymer substrate 3, polymerizing a monomer of a positive refractive index polymer to form a positive birefringence substrate;

manufacturing a light-shielding layer and a colored layer on the positive birefringence substrate, and manufacturing a PI alignment film by printing orientation, to form the positive birefringence polymer substrate 3;

S2: manufacturing a negative birefringence polymer substrate, wherein, polymerizing a monomer of a negative refractive index polymer to form a negative birefringence substrate, a birefringence retardation of the negative birefringence substrate in an original birefringence state being equal to a birefringence retardation of the positive birefringence substrate in the original birefringence state, and a birefringence retardation of the negative birefringence substrate in a photo-elasticity birefringence state being equal to a birefringence retardation of the positive birefringence substrate in the photo-elasticity birefringence state;

manufacturing a TFT array on the negative birefringence substrate, and manufacturing a PI alignment film by printing orientation, to form the negative birefringence polymer substrate 1;

S3: injecting a liquid crystal between the positive birefringence polymer substrate 3 and the negative birefringence polymer substrate 1, and sealing the positive birefringence polymer substrate and the negative birefringence polymer substrate by a sealant;

S4: attaching an upper polarizer 4 on an upper surface of the positive birefringence polymer substrate 3 in S3, attaching a lower polarizer 5 on a lower surface of the negative birefringence polymer substrate 1 in S3, in which a polarization direction of the upper polarizer 4 is perpendicular to a polarization direction of the lower polarizer 5, to form the TFT-LCD panel.

In which, the positive birefringence substrate is formed by polymerizing a monomer of a positive refractive index polymer, both an original birefringence (OB) of the polymerized substrate and a photo-elasticity birefringence (PB) of the polymerized substrate are positive, i.e., under either an original state or an elastic pressure, a birefringence retardation of the substrate is positive or zero.

The monomer of the positive refractive index polymer for example is 4-cinnamoylphenyl methacrylate (CPMA), having a structure shown as formula (1), but not limited to the illustrated monomer.

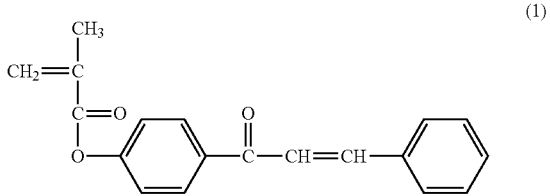 [SMILES: C=C(C)C(=O)Oc1ccc(C(=O)C=Cc2ccccc2)cc1]

(1)

The negative birefringence substrate is formed by polymerizing a monomer of a negative refractive index polymer, both the original birefringence (OB) of the polymerized substrate and the photo-elasticity birefringence (PB) of the polymerized substrate are negative, i.e., under either an original state or an elastic pressure, a birefringence retardation of the substrate is negative or zero.

The monomer of the negative refractive index polymer is methyl methacrylate (MMA), having a structure shown as formula (2), but not limited to the illustrated monomer.

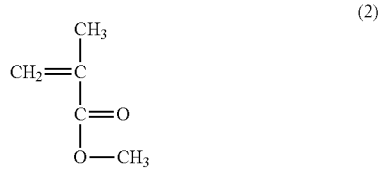

(2)

During the above manufacturing, by controlling a condition for synthesizing the two kinds of the substrates, it is possible to equate a birefringence retardation of a positive birefringence substrate in OB state with a birefringence retardation of a negative birefringence substrate in OB state, which have two opposite properties, and to equate a birefringence retardation of a positive birefringence substrate in PB state with a birefringence retardation of a negative birefringence substrate in PB state, which have two opposite properties, i.e., $R_{OB-MMA}=R_{OB-CPMA}$; $R_{PB-MMA}=R_{PB-CPMA}$.

The above are merely the preferred embodiments of the present invention. It should be noted that, a person skilled in the art may further make improvements and modifications without departing from the principle of the present invention, and these improvements and modifications shall also be considered as the scope of the present invention.

What is claimed is:

1. A thin film transistor-liquid crystal display (TFT-LCD) panel, comprising an upper polarizer, a positive birefringence polymer substrate, a liquid crystal layer, a negative birefringence polymer substrate and a lower polarizer, wherein the positive birefringence polymer substrate is located at an upper side of the liquid crystal layer, the negative birefringence polymer substrate is located at a lower side of the liquid crystal layer, the upper polarizer is located at an upper surface of the positive birefringence polymer substrate, and the lower polarizer is located at a lower surface of the negative birefringence polymer substrate;

a magnitude of a birefringence retardation of the positive birefringence polymer substrate in an original birefringence state is equal to a magnitude of a birefringence retardation of the negative birefringence polymer substrate in the original birefringence state, and a magnitude of a birefringence retardation of the positive birefringence polymer substrate in a photo-elasticity birefringence state is equal to a magnitude of a birefringence retardation of the negative birefringence polymer substrate in the photo-elasticity birefringence state;

the positive birefringence polymer substrate comprises a positive birefringence substrate that is formed by polymerizing a monomer of a positive refractive index polymer, and the monomer of the positive refractive index polymer is 4-cinnamoylphenyl methacrylate; and the negative birefringence polymer substrate comprises a negative birefringence substrate that is formed by polymerizing a monomer of a negative refractive index polymer, and the monomer of the negative refractive index polymer is methyl methacrylate.

2. The TFT-LCD panel according to claim 1, wherein the positive birefringence polymer substrate further comprises a colored layer, a light-shielding layer and a polyimide alignment film.

3. The TFT-LCD panel according to claim 1, wherein the negative birefringence polymer substrate further comprises a TFT array and a polyimide alignment film.

4. The TFT-LCD panel according to claim 1, wherein a polarization direction of the upper polarizer is perpendicular to a polarization direction of the lower polarizer.

5. A TFT display device, comprising the TFT-LCD panel according to claim 1.

6. The TFT display device according to claim 5, wherein the positive birefringence polymer substrate further comprises a colored layer, a light-shielding layer and a polyimide alignment film.

7. The TFT display device according to claim 5, wherein the negative birefringence polymer substrate further comprises a TFT array and a polyimide alignment film.

8. The TFT display device according to claim 5, wherein a polarization direction of the upper polarizer is perpendicular to a polarization direction of the lower polarizer.

9. A method for manufacturing a TFT-LCD panel, comprising following steps:

S1: manufacturing a positive birefringence polymer substrate, polymerizing a monomer of a positive refractive index polymer to form a positive birefringence substrate; manufacturing a light-shielding layer and a colored layer on the positive birefringence substrate, and then manufacturing a polyimide alignment film by printing orientation, to form the positive birefringence polymer substrate;

S2: manufacturing a negative birefringence polymer substrate, polymerizing a monomer of a negative refractive index polymer to form a negative birefringence substrate, a magnitude of a birefringence retardation of the negative birefringence substrate in an original birefringence state being equal to a magnitude of a birefringence retardation of the positive birefringence substrate in the original birefringence state, and a magnitude of a birefringence retardation of the negative birefringence substrate in a photo-elasticity birefringence state being equal to a magnitude of a birefringence retardation of the positive birefringence substrate in the photo-elasticity birefringence state; manufacturing a TFT array on the negative birefringence substrate, and manufacturing a PI alignment film by printing orientation, to form the negative birefringence polymer substrate;

S3: injecting a liquid crystal between the positive birefringence polymer substrate and the negative birefringence polymer substrate, and sealing the positive birefringence polymer substrate and the negative birefringence polymer substrate by a sealant;

S4: attaching an upper polarizer on an upper surface of the positive birefringence polymer substrate in S3, attaching a lower polarizer on a lower surface of the negative birefringence polymer substrate in S3, wherein a polarization direction of the upper polarizer is perpendicular to a polarization direction of the lower polarizer, to form the TFT-LCD panel, wherein the monomer of the positive refractive index polymer is 4-cinnamoylphenyl methacrylate, and wherein the monomer of the negative refractive index polymer is methyl methacrylate.

* * * * *